United States Patent
Noh et al.

(10) Patent No.: US 11,243,709 B2
(45) Date of Patent: Feb. 8, 2022

(54) DATA STORAGE APPARATUS AND OPERATING METHOD THEREOF

(71) Applicant: SK hynix Inc., Icheon (KR)

(72) Inventors: Jung Ki Noh, Icheon (KR); Yong Jin, Seoul (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/841,274

(22) Filed: Apr. 6, 2020

(65) Prior Publication Data
US 2021/0055864 A1 Feb. 25, 2021

(30) Foreign Application Priority Data

Aug. 22, 2019 (KR) .......................... 10-2019-0103087

(51) Int. Cl.
*G06F 12/00* (2006.01)
*G06F 3/06* (2006.01)
*G06F 12/0804* (2016.01)
*G06F 12/02* (2006.01)

(52) U.S. Cl.
CPC .............. *G06F 3/065* (2013.01); *G06F 3/068* (2013.01); *G06F 3/0619* (2013.01); *G06F 3/0659* (2013.01); *G06F 12/0246* (2013.01); *G06F 12/0804* (2013.01); *G06F 2212/1032* (2013.01)

(58) Field of Classification Search
CPC ...... G06F 3/065; G06F 3/0619; G06F 3/0659; G06F 3/068; G06F 12/0246; G06F 12/0804; G06F 2212/1032
See application file for complete search history.

(56) References Cited

U.S. PATENT DOCUMENTS

| | | | |
|---|---|---|---|
| 9,418,699 B1 | 8/2016 | Gibbons et al. | |
| 9,875,038 B2 * | 1/2018 | Jang | G06F 12/0246 |
| 10,643,707 B2 * | 5/2020 | Rajamani | G06F 3/0679 |
| 10,698,817 B2 | 6/2020 | Gharpure et al. | |
| 10,747,666 B2 | 8/2020 | Ishiyama | |

(Continued)

FOREIGN PATENT DOCUMENTS

| KR | 10-0825802 B1 | 4/2008 |
|---|---|---|
| KR | 10-2011-0046243 A | 5/2011 |

(Continued)

OTHER PUBLICATIONS

Non-Final Office Action for related U.S. Appl. No. 16/877,239, dated Apr. 16, 2021.

(Continued)

*Primary Examiner* — Prasith Thammavong

(57) ABSTRACT

A data storage apparatus includes a volatile memory, the volatile memory including a region in which a zone mapping table and system information are stored and a random access zone capable of random write. The data storage apparatus further includes a non-volatile memory including a backup zone and a plurality of sequential zones capable of sequential write, and a controller configured to identify whether a logical address belongs to the random access zone or the sequential zone when the logical address and a data size are received along with a write command or read command from a host apparatus and to control an operation corresponding to the write command or read command.

25 Claims, 14 Drawing Sheets

FIG.5

(56) References Cited

U.S. PATENT DOCUMENTS

| | | | |
|---|---|---|---|
| 2007/0150645 A1* | 6/2007 | Chandramouli | G06F 12/0246 711/103 |
| 2008/0282105 A1* | 11/2008 | Deenadhayalan | G06F 11/1076 714/6.12 |
| 2010/0023682 A1* | 1/2010 | Lee | G06F 12/0246 711/103 |
| 2010/0174870 A1* | 7/2010 | Banerjee | G06F 12/0866 711/143 |
| 2011/0099323 A1* | 4/2011 | Syu | G06F 12/0246 711/103 |
| 2011/0161563 A1* | 6/2011 | Chang | G06F 12/0246 711/103 |
| 2011/0302446 A1* | 12/2011 | Becker-Szendy | G06F 11/1076 714/6.1 |
| 2012/0072801 A1* | 3/2012 | Takeuchi | G06F 1/3275 714/755 |
| 2012/0084484 A1 | 4/2012 | Post et al. | |
| 2013/0173857 A1* | 7/2013 | Cheon | G06F 3/064 711/103 |
| 2014/0082265 A1* | 3/2014 | Cheng | G06F 12/0246 711/103 |
| 2014/0258588 A1* | 9/2014 | Tomlin | G06F 12/0246 711/103 |
| 2014/0289355 A1 | 9/2014 | Imai | |
| 2015/0046670 A1* | 2/2015 | Kim | G06F 11/1471 711/207 |
| 2015/0205539 A1* | 7/2015 | Moon | G06F 12/0246 711/103 |
| 2015/0347026 A1* | 12/2015 | Thomas | G06F 12/0246 711/103 |
| 2016/0342509 A1* | 11/2016 | Kotte | G06F 12/0246 |
| 2018/0129453 A1 | 5/2018 | Kim | |
| 2018/0357170 A1* | 12/2018 | Benisty | G06F 12/0868 |
| 2018/0364938 A1* | 12/2018 | Habbinga | G06F 3/0671 |
| 2019/0065387 A1* | 2/2019 | Duzly | G06F 3/0679 |
| 2019/0102250 A1* | 4/2019 | O'Krafka | G11C 29/52 |
| 2019/0187934 A1* | 6/2019 | Sicola | G06F 3/0659 |
| 2019/0220416 A1* | 7/2019 | Jung | G06F 12/1009 |
| 2019/0227735 A1* | 7/2019 | Shaked | G06F 3/0653 |
| 2021/0165579 A1 | 6/2021 | Bernat et al. | |
| 2021/0248842 A1 | 8/2021 | Dittrich et al. | |

FOREIGN PATENT DOCUMENTS

| | | |
|---|---|---|
| KR | 101449524 B1 | 10/2014 |
| KR | 10-1506675 B1 | 3/2015 |
| KR | 10-1636248 B1 | 7/2016 |
| KR | 10-2018-0024615 A | 3/2018 |
| KR | 1020190060328 | 6/2019 |

OTHER PUBLICATIONS

Final Office Action for related U.S. Appl. No. 16/877,239, dated Oct. 14, 2021.

Notice of Allowance for U.S. Appl. No. 16/847,555, dated Dec. 1, 2021.

* cited by examiner

FIG.6

Zone mapping table 600

| LBA Group | Zone Index | Start PBA | Total Length | Final write location |
|---|---|---|---|---|
| LBAG 0 | Zone 0 | PBA 0 | M | PBA Number |
| LBAG 1 | Zone 1 | PBA 100 | M | PBA Number |
| ... | ... | ... | ... | ... |
| LBAG A | Zone N | PBA B | M | PBA Number |
| LBAG A+1 | Zone N+1 | PBA B+M | M | PBA Number |

DATA STORAGE APPARATUS AND OPERATING METHOD THEREOF

CROSS-REFERENCE TO RELATED APPLICATION

The present application claims priority under 35 U.S.C. § 119(a) to Korean application number 10-2019-0103087, filed on Aug. 22, 2019, in the Korean Intellectual Property Office, which is incorporated herein by reference in its entirety.

BACKGROUND

1. Technical Field

Various embodiments generally relate to a semiconductor apparatus, and more particularly, to a data storage apparatus and an operating method thereof.

2. Related Art

A data storage apparatus using a memory apparatus has advantages in that it has excellent stability and durability, a very high access speed of information, and low power consumption because it does not include a mechanical driver. A data storage apparatus having such advantages includes a universal serial bus (USB) memory apparatus, a memory card having various interfaces, a universal flash storage (US) apparatus, and a solid state drive.

Solid state drives may include a NAND flash memory. Memory locations in the NAND flash memory may not be overwritten, but are instead erased between each write. Accordingly, it is necessary to match and manage a logical address used in a host apparatus and a physical address used in a NAND flash memory.

A mapping table between a logical address and a physical address may be managed in a 4-kilobyte (KB) unit, such that contiguous blocks of logical addresses each corresponding to 4 KB are mapped into corresponding blocks of physical addresses each corresponding to 4 KB. In order to improve data access performance, the mapping table may be stored in a volatile random access memory (RAM), such as a dynamic random access memory (DRAM). In this document, "random" refers to the ability to read and write the memory in any order, which includes being able to overwrite previously-written data.

SUMMARY

Various embodiments are directed to the provision of a data storage apparatus having enhanced write performance by securing a data storage space of a volatile memory as a region capable of random write, and an operating method thereof.

In an embodiment, a data storage apparatus includes a volatile memory, the volatile memory including a region in which a zone mapping table and system information are stored and a random access zone suitable for random writes; a non-volatile memory including a backup zone and a plurality of sequential zones suitable for sequential writes; and a controller configured to identify whether a logical address received with a command from a host apparatus belongs to the random access zone or to the sequential zone and to control an operation corresponding to the command of the identified zone, wherein the controller is configured to back up data stored in the random access zone onto the backup zone based on a criterion and to recover the data stored in the backup zone into the random access zone when a state of the controller switches to an on state after power is off.

In an embodiment, an operating method of a data storage apparatus includes receiving a logical address and a command from a host; identifying whether the logical address belongs to a random access zone within a volatile memory or to a sequential zone within a non-volatile memory, the volatile memory including a region in which a zone mapping table and system information are stored and the random access zone suitable for random writes, and the non-volatile memory including a backup zone and a plurality of sequential zones suitable for sequential writes; and performing an operation corresponding to the command based on the identified random access zone or sequential zone.

According to the embodiments, a data storage space for writing data may be secured in a volatile memory through a change in the structure of a mapping table, and performance of a write operation can thereby be improved because a write speed can be increased due to characteristic of the volatile memory.

Furthermore, it is possible to prevent a loss of data of the volatile memory because data stored in the data storage space secured in the volatile memory is backed up and recovered using a non-volatile memory.

BRIEF DESCRIPTION OF THE DRAWINGS

FIG. 6 illustrates an example of a zone mapping table according to an embodiment.

DETAILED DESCRIPTION

Hereinafter, a data storage apparatus and an operating process thereof will be described below with reference to the accompanying drawings through various examples of embodiments.

Figure 1:
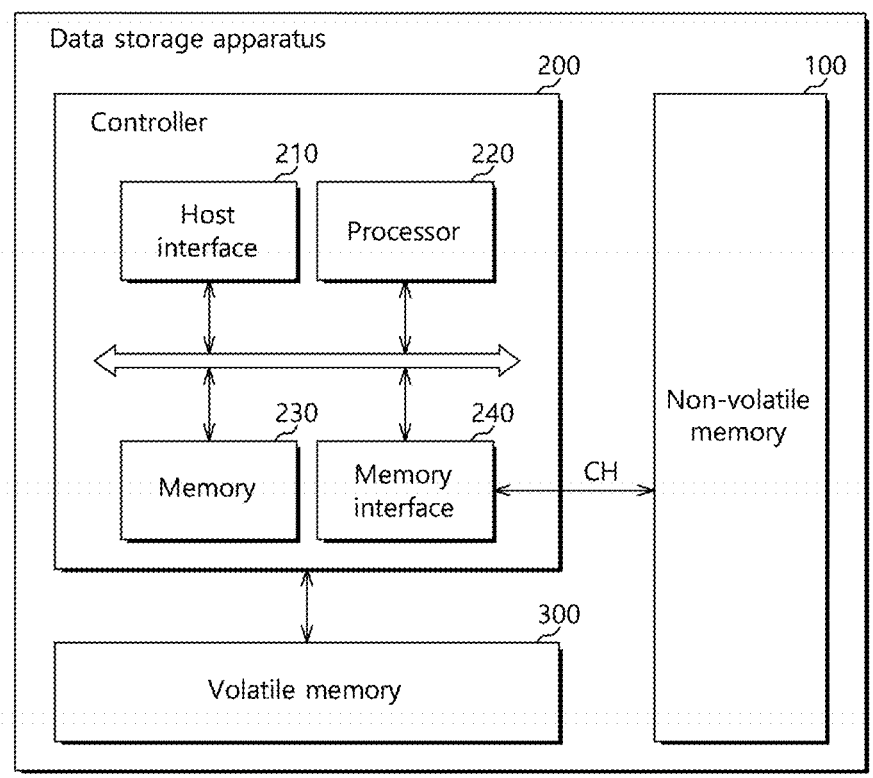
FIG. 1 illustrates a data storage apparatus according to an embodiment.

FIG. 1 is a diagram illustrating a data storage apparatus 10 according to an embodiment.

The data storage apparatus 10 may store data accessed by a host apparatus (not illustrated), such as a mobile phone, an MP3 player, a laptop computer, a desktop computer, a game machine, TV or an in-vehicle infotainment system. The data storage apparatus 10 may be called a memory system.

The data storage apparatus 10 may be fabricated as any one of various types of storage apparatuses depending on an interface protocol electrically coupled to the host apparatus. For example, the data storage apparatus 10 may be configured as any one of various types of storage apparatuses, such as a multimedia card of a solid state drive (SSD), MMC, eMMC, RS-MMC or micro-MMC form, a secure digital card of an SD, mini-SD or micro-SD form, a storage apparatus of a universal serial bus (USB) storage apparatus, universal flash storage (UFS) apparatus or personal computer memory card international association (PCMCIA) card form, a storage apparatus of a peripheral component interconnection (PCI) card form, a storage apparatus of a PCI-express (PCI-E) card form, a compact flash (CF) card, a smart media card, and a memory stick.

The data storage apparatus 10 may be fabricated as one of various types of package forms. For example, the data storage apparatus 10 may be fabricated as any one of various types of package forms, such as a package on package (POP), a system in package (SIP), a system on chip (SOC), a multi-chip package (MCP), a chip on board (COB), a wafer-level fabricated package (WFP) and a wafer-level stack package (WSP).

As illustrated in FIG. 1, the data storage apparatus 10 may include a non-volatile memory 100, a controller 200 and a volatile memory 300.

The non-volatile memory 100 may operate as a storage medium of the data storage apparatus 10. The non-volatile memory 100 may be configured as one of various types of non-volatile memories, such as a NAND flash memory apparatus, a NOR flash memory apparatus, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using transition metal oxide, depending on the memory cells used, but embodiments are not limited thereto.

Figure 2:
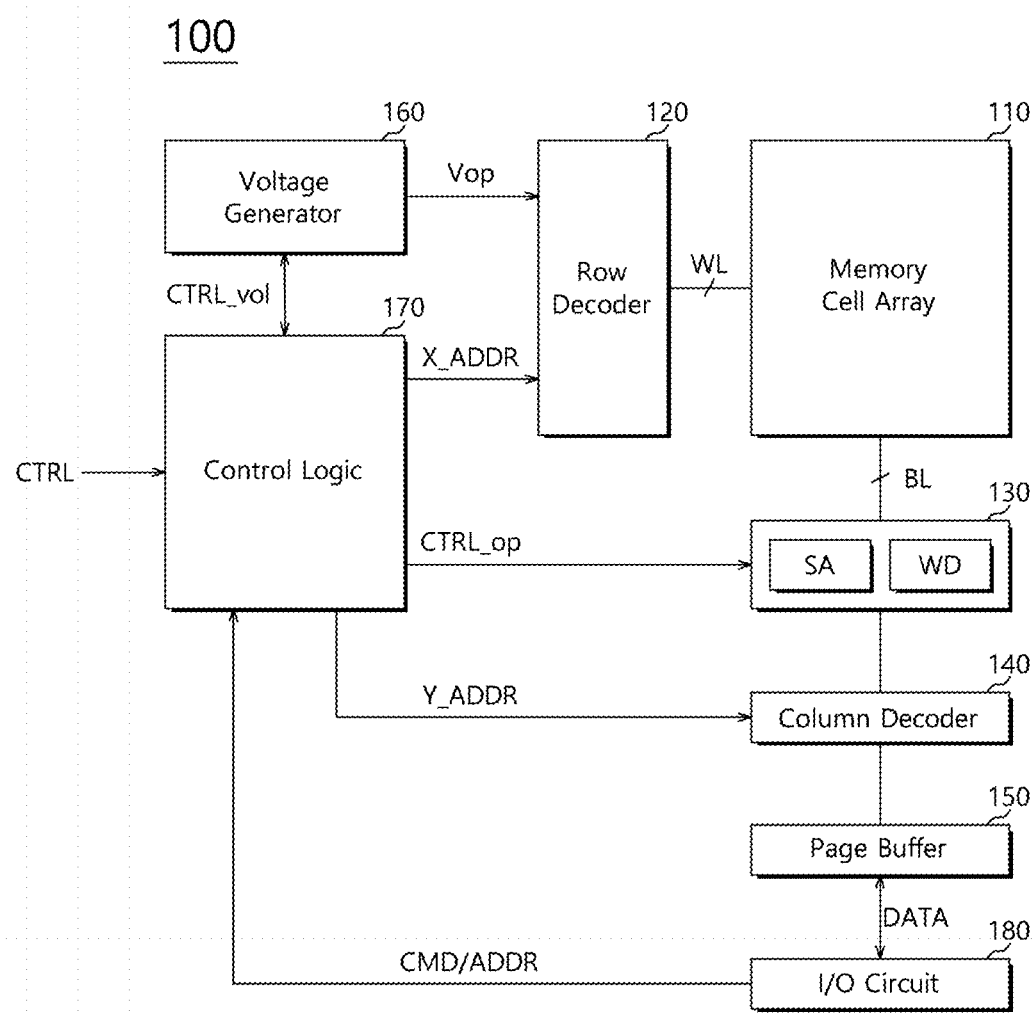
FIG. 2 illustrates a non-volatile memory according to an embodiment.
Figure 3:
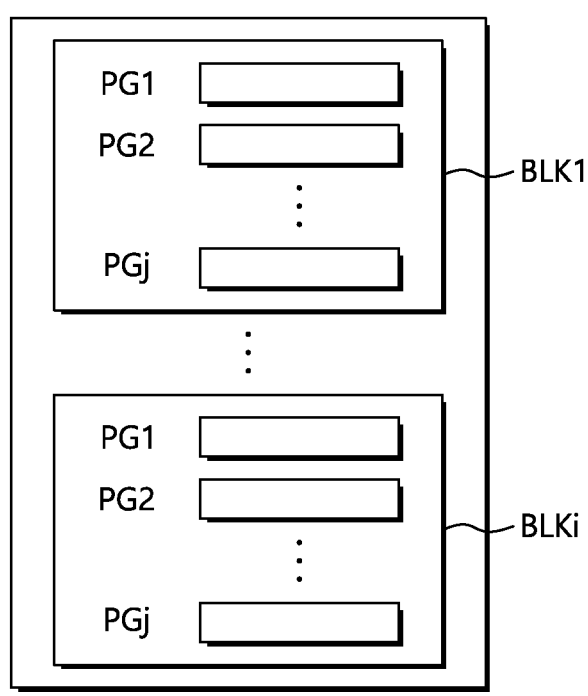
FIG. 3 illustrates a memory cell array according to an embodiment.

FIG. 2 illustrates the non-volatile memory 100 in FIG. 1. FIG. 3 illustrates a memory cell array 110 in FIG. 2.

Referring to FIG. 2, the non-volatile memory 100 may include the memory cell array 110, a row decoder 120, a write/read circuit 130, a column decoder 140, a page buffer 150, a voltage generator 160, control logic 170, and an input/output (I/O) circuit 180.

The memory cell array 110 may include a plurality of memory cells (not illustrated) disposed at respective regions in which a plurality of bit lines BL and a plurality of word lines WL intersect with each other. Referring to FIG. 3, the memory cell array 110 may include a plurality of memory blocks BLK1 to BLKi. Each of the plurality of memory blocks BLK1 to BLKi may include a plurality of pages PG1 to PGj. In embodiments, a memory block corresponds to the smallest unit of the memory cell array 110 that can be independently erased, and a page corresponds to the smallest unit of the memory cell array 110 that can be independently programmed.

Each of the memory cells of the memory cell array 110 may be a single-level cell (SLC) in which 1-bit data is stored, a multi-level cell (MLC) in which 2-bit data is stored, a triple-level cell (TLC) in which 3-bit data is stored, or a quadruple-level cell (QLC) in which 4-bit data is stored. The memory cell array 110 may include at least one of an SLC, an MLC, a TLC, a QLC, and combinations thereof. The memory cell array 110 may include memory cells disposed in a two-dimensional horizontal structure or may include memory cells disposed in a three-dimensional vertical structure.

The row decoder 120 may be electrically coupled to the memory cell array 110 through the word lines WL. The row decoder 120 may operate under the control of the control logic 170. The row decoder 120 may decode a row address X_ADDR provided by the control logic 170, may select at least one of the word lines WL based on a result of the decoding, and may drive the selected word line WL. The row decoder 120 may provide the selected word line WL with an operating voltage Vop provided by the voltage generator 160.

The write/read circuit 130 may be electrically coupled to the memory cell array 110 through the bit lines BL. The write/read circuit 130 may include write/read circuits (not illustrated) corresponding to the respective bit lines BL. The write/read circuit 130 may operate under the control of the control logic 170. The write/read circuit 130 may include a write driver WD for writing data in memory cells and a sense amplifier (SA) for amplifying data read from memory cells. The write/read circuit 130 may provide a current pulse or voltage pulse to memory cells that belong to the memory cells of the memory cell array 110 and that are selected by the row decoder 120 and the column decoder 140, thereby performing write and read operations on the selected memory cells.

The column decoder 140 may operate under the control of the control logic 170. The column decoder 140 may decode a column address Y_ADDR provided by the control logic 170. The column decoder 140 may electrically couple write/read circuits of the write/read circuit 130, corresponding to respective bit lines BL, and the page buffer 150 based on a result of the decoding.

The page buffer 150 may be configured to temporarily store data, such as provided by a memory interface 240 of the controller 200 and to be written in the memory cell array 110, or data read from the memory cell array 110 and to be provided to the memory interface 240 of the controller 200. The page buffer 150 may operate under the control of the control logic 170.

The voltage generator 160 may generate various voltages for performing write, read and erase operations on the memory cell array 110 based on a voltage control signal CTRL_vol provided by the control logic 170. The voltage generator 160 may generate driving voltages Vop for driving the plurality of word lines WL and bit lines BL. Furthermore, the voltage generator 160 may generate at least one reference voltage in order to read data stored in a memory cell MC.

The control logic 170 may output various types of control signals for writing data DATA in the memory cell array 110 or reading data DATA from the memory cell array 110 based on a command CMD_op, address ADDR and control signal CTRL received from the controller 200. The various types of control signals output by the control logic 170 may be provided to the row decoder 120, the write/read circuit 130, the column decoder 140, the page buffer 150 and the voltage generator 160. Accordingly, the control logic 170 may generally control various types of operations performed in the non-volatile memory 100.

Specifically, the control logic 170 may generate an operation control signal CTRL_op based on a command CMD and a control signal CTRL, and may provide the generated operation control signal CTRL_op to the write/read circuit 130. The control logic 170 may provide the row decoder 120 and the column decoder 140 with a row address X_ADDR and column address Y_ADDR included in an address ADDR, respectively.

The I/O circuit 180 may be configured to receive a command CMD, address ADDR and data DATA provided by the controller 200 or to provide the controller 200 with data DATA read from the memory cell array 110. The I/O circuit 180 may output the command CMD and address ADDR, received from the controller 200, to the control logic 170, and may output the data DATA to the page buffer 150. The I/O circuit 180 may output, to the controller 200, data DATA received from the page buffer 150. The I/O circuit 180 may operate under the control of the control logic 170.

The controller 200 may control an overall operation of the data storage apparatus 10 through the execution of firmware or software loaded on a memory 230. The controller 200 may decode and execute instructions or algorithms of a code form, such as firmware or software. The controller 200 may be implemented in the form of hardware or a combination of hardware and software.

Figure 4:
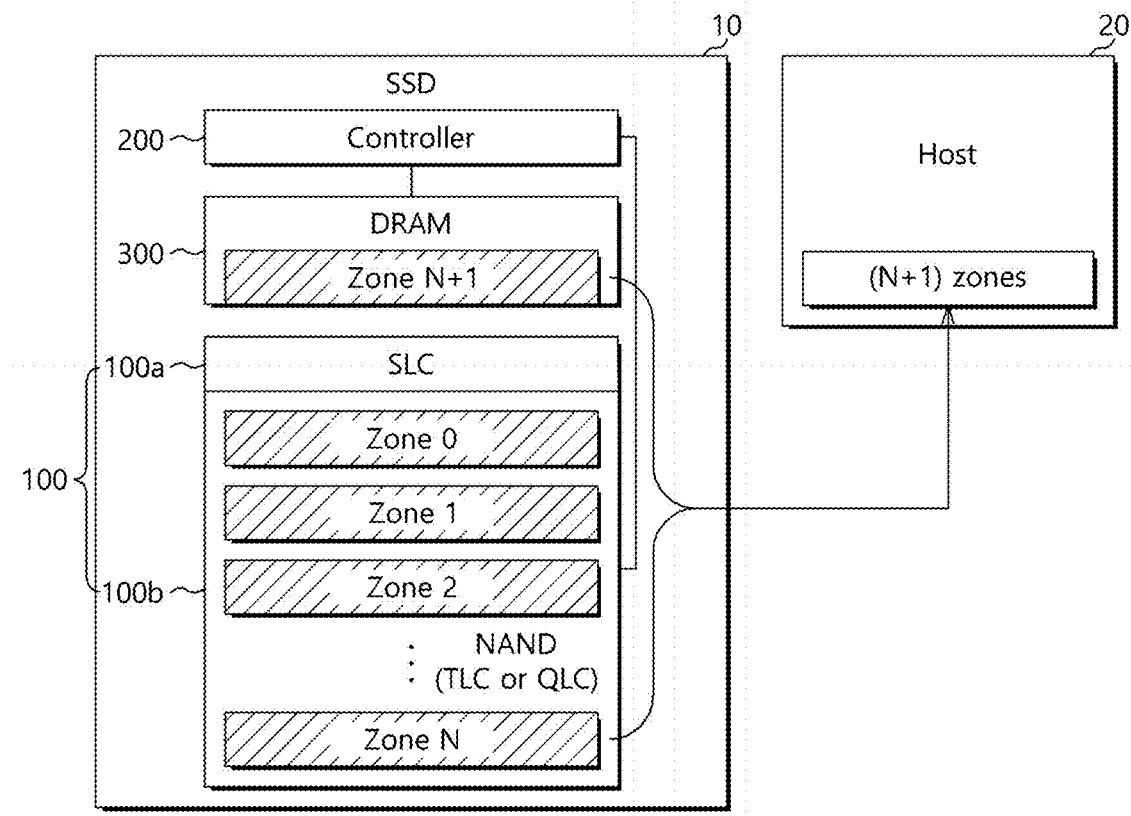
FIG. 4 illustrates a data processing system according to an embodiment.

The controller 200 may control data to be written to or read from the non-volatile memory 100 or the volatile memory 300 in response to a write command or read command transmitted by a host apparatus 20 (refer to FIG. 4). This will be described in detail later.

The controller 200 may include a host interface 210, a processor 220, the memory 230 and the memory interface 240.

The host interface 210 may provide an interface between a host apparatus and the data storage apparatus 10 in accordance with a protocol of the host apparatus. For example, the host interface 210 may communicate with the host apparatus through one of protocols, such as a universal serial bus (USB), a universal flash storage (UFS), a multimedia card (MMC), a parallel advanced technology attachment (PATA), a serial advanced technology attachment (SATA), a small computer system interface (SCSI), a serial attached SCSI (SAS), a peripheral component interconnection (PCI), and a PCI express (PCI-e).

The processor 220 may be configured with a micro control unit (MCU) and/or a central processing unit (CPU). The processor 220 may process a request transmitted by the host apparatus. In order to process the request transmitted by the host apparatus, the processor 220 may execute an instruction or algorithm of a code form, that is, firmware loaded on the memory 230, and may control internal function blocks, such as the host interface 210, the memory 230 and the memory interface 240, and the non-volatile memory 100.

The processor 220 may generate control signals that will control an operation of the non-volatile memory 100 based on requests transmitted by the host apparatus, and may provide the generated control signals to the non-volatile memory 100 through the memory interface 240.

The memory 230 may be configured as a random access memory, such as a dynamic random access memory (DRAM) or a static random access memory (SRAM). The memory 230 may store firmware executed by the processor 220. Furthermore, the memory 230 may store data used by the firmware, for example, meta data. That is, the memory 230 may operate as a working memory of the processor 220.

The memory 230 may be configured to include a data buffer (DB) (not illustrated) for temporarily storing one or both of write data to be transmitted from the host apparatus to the non-volatile memory 100 and read data to be transmitted from the non-volatile memory 100 to the host apparatus. That is, the memory 230 may operate as a buffer memory.

The memory interface 240 may control the non-volatile memory 100 under the control of the processor 220. The memory interface 240 may also be called a memory controller. The memory interface 240 may communicate with the non-volatile memory 100 using channel signals CH. The channel signals CH may include a command, an address, and an operation control signal for controlling the non-volatile memory 100. The memory interface 240 may use the channel signals CH to provide data to the non-volatile memory 100 or to receive data from the non-volatile memory 100.

Figure 5:
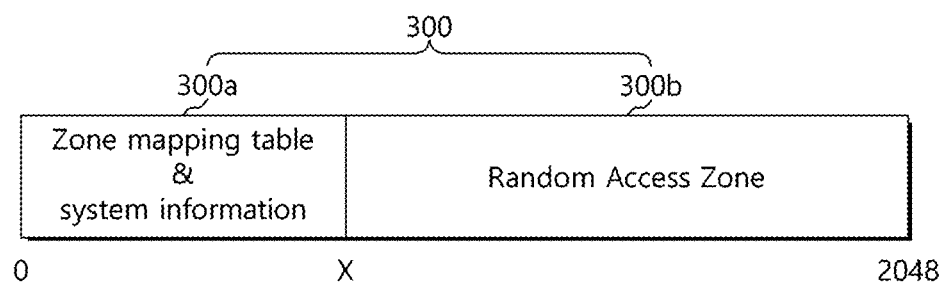
FIG. 5 illustrates a volatile memory according to an embodiment.

As illustrated in FIG. 5, the volatile memory 300 may include a region 300a in which a zone mapping table and system information are stored and a random access zone 300b capable of random write. This will be described in detail later.

FIG. 4 is a diagram illustrating a data processing system 1100 according to an embodiment.

Figure 7:
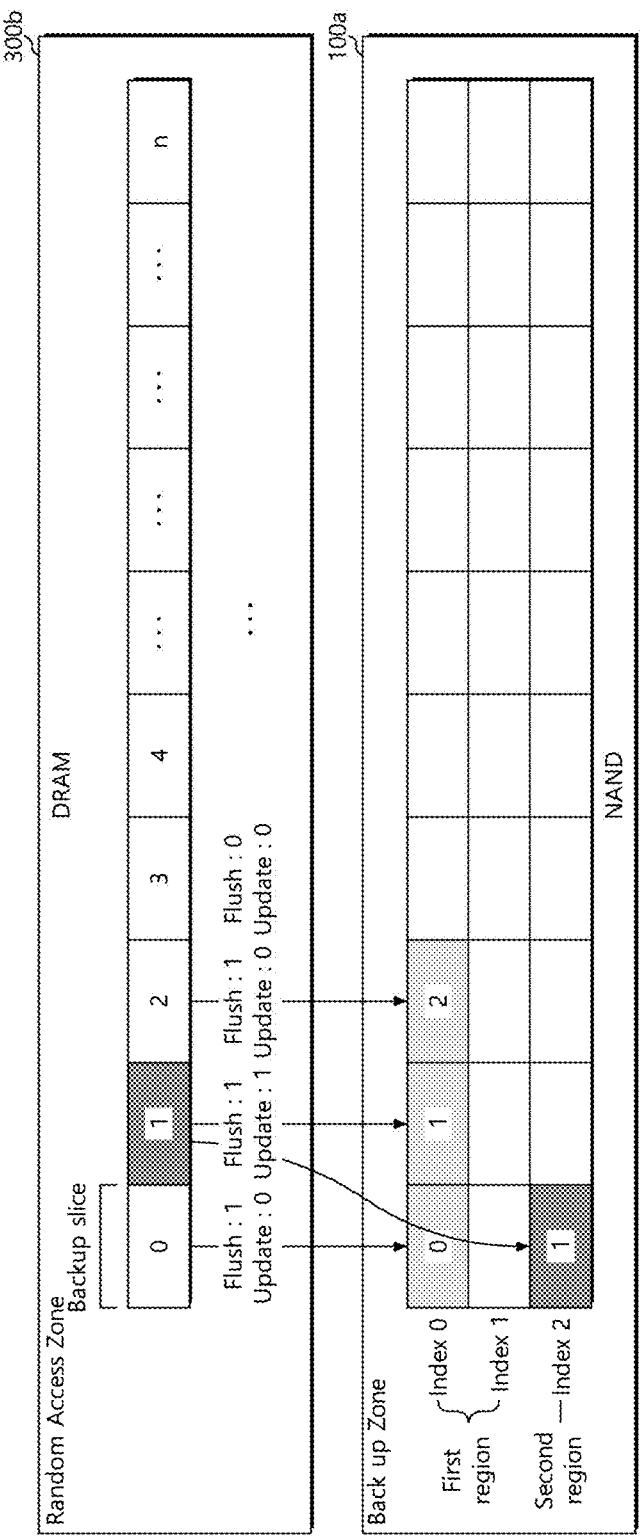
FIG. 7 illustrates a backup process according to an embodiment.
Figure 8:
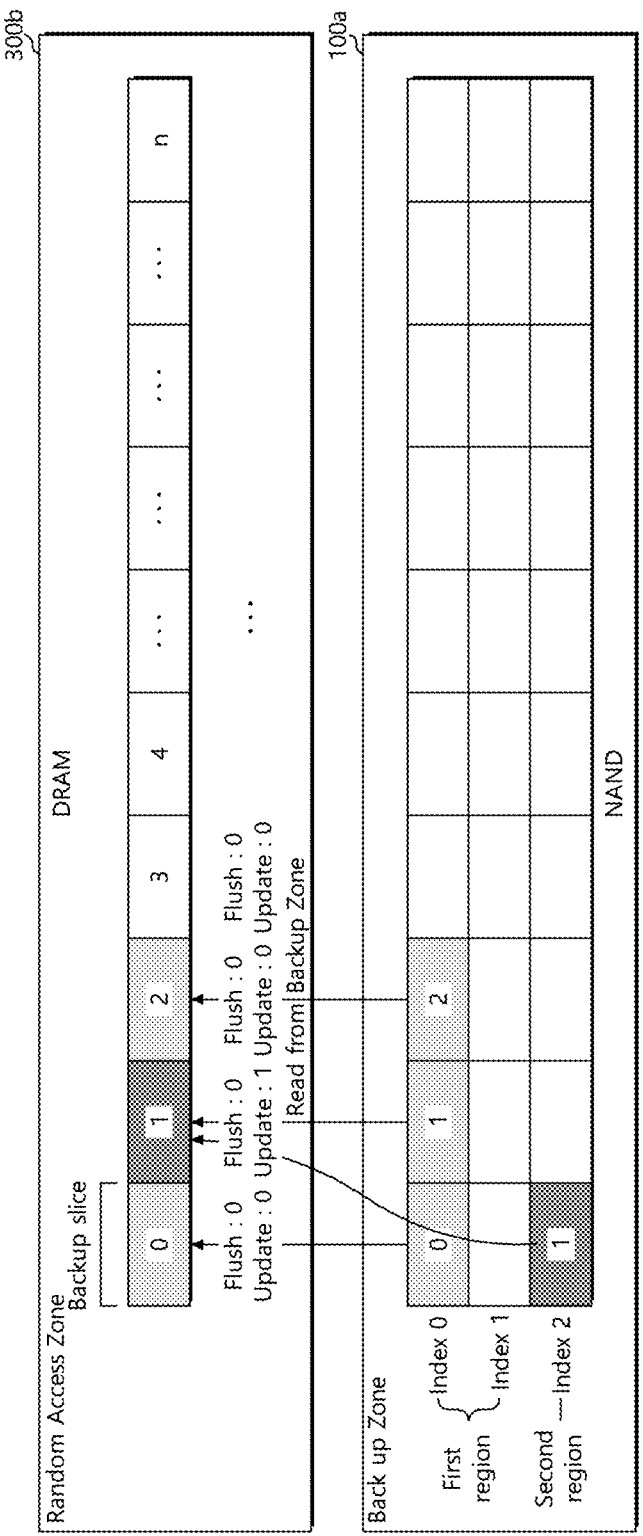
FIG. 8 illustrates a recovery process according to an embodiment.

The data processing system 1100 will be described below with reference to FIG. 5 illustrating the configuration of a volatile memory according to an embodiment, FIG. 6 illustrating an example of a zone mapping table 600 according to an embodiment, FIG. 7, illustrating a backup process according to an embodiment, and FIG. 8 illustrating a recovery process according to an embodiment.

Referring to FIG. 4, the data processing system 1100 may include the data storage apparatus 10 (for example, an SSD) and the host apparatus 20.

The data storage apparatus 10 may include the non-volatile memory 100, the controller 200 and the volatile memory 300.

The non-volatile memory 100 may be configured with a set of zones Zone 0 to Zone N having the same size, that is, a NAND flash region. In this case, each of the zones may respectively include one or more physical blocks.

Referring to FIG. 4, the non-volatile memory 100 may include a backup zone 100a and a plurality of sequential zones 100b capable of sequential write.

The backup zone 100a is a backup space for providing a non-volatile characteristic of the random access zone 300b provided using the volatile memory 300 and that is a marginal space outside of a system region of the volatile memory 300. In an embodiment, the backup zone 100a may be used in an SLC way. The backup zone 100a may have a size two times or three times greater than the size of the random access zone 300b, but embodiments are not limited thereto.

The sequential zone 100b is a user region, and may be used in a TLC or QLC way. In this case, a write operation may be performed on the sequential zone 100b in a sequential write way.

Referring to FIG. 5, the volatile memory 300 may include the region 300a in which a zone mapping table for managing the physical addresses of zones and system information are stored and the random access zone 300b capable of random write. In this case, the volatile memory 300 may be implemented as a DRAM, but embodiments are not limited thereto.

A zone according to an embodiment may have a relatively larger size than a page or block, and the zone mapping table may include a start physical block address (Start PBA), a total length and the final write location for each zone. Accordingly, a marginal space may occur in a region of the volatile memory 300 because the amount of stored mapping data is reduced compared to a conventional technology.

Specifically, as illustrated in FIG. 6, the zone mapping table 600 stored in the volatile memory 300 may include for each zone a logical block address group, a zone index, a start physical block address (PBA 0), a total length and the final write location. The logical block address group may be defined to mean a plurality of logical block addresses grouped by a given number. The zone index may be defined to mean identification information for identifying a respective zone. The final write location of the zone mapping table 600 may be defined to mean the last write location of the respective zone at the present time. The total length may be defined to mean a total length of physical address.

For example, a logical block address group 0 (LBAG 0) may include Logical Block Address (LBA) 0 to LBA 99. Each of the other logical address groups may include 100 logical block addresses. Such a logical block address group may be matched with one zone. In contrast, in a conventional technology, the amount of data included in a mapping table is massive because a logical block address and a physical block address are matched in a one-to-one way. In an embodiment, the amount of data included in the mapping table can be reduced because a plurality of logical block addresses are matched with one zone and managed accordingly.

For this reason, in the zone mapping table 600, the size of mapping data is relatively reduced because the mapping data can be managed in a zone unit without using a mapping process of a 4 KB unit as in a conventional technology. As a result, a marginal space of the volatile memory 300 can be secured. A region of the volatile memory 300, secured because the size of a zone mapping table 600 is reduced due to a change in the structure of the zone mapping table, may be used as the random access zone 300*b* capable of random write.

Each of the non-volatile memory 100 and the volatile memory 300 may be configured with a plurality of zones (Zone 0 to Zone N+1). Accordingly, the host apparatus 20 may recognize, as a logical region, each of the plurality of zones within the volatile memory 300 and the non-volatile memory 100. That is, the host apparatus 20 may recognize the data storage apparatus 10 as a storage apparatus including a plurality of zones. For example, the host apparatus 20 may recognize (N+1) zones (refer to FIG. 4).

When a logical address is received along with a write command or read command from the host apparatus 20, the controller 200 may identify, such as by using the zone mapping table 600, whether the logical address belongs to the random access zone 300*b* or the sequential zone 100*b*, and then may control an operation, corresponding to the write command or read command of the identified zone, to be performed. The controller 200 may also receive the size of data when a write command or a read command is received from the host apparatus 20. The logical address may mean the start logical address of the data to be read or written. If the logical address belongs to the random access zone or the sequential zone, this may mean that a physical address corresponding to the logical address belongs to the random access zone or the sequential zone, respectively.

That is, if the logical address belongs to the sequential zone, the controller 200 may control an operation, corresponding to the write command or read command, to be performed using the physical address corresponding to the logical address as a start address, wherein the physical address is an address within a sequential zone. If the logical address belongs to the random access zone, the controller 200 may control an operation, corresponding to the write command or read command, to be performed using the physical address corresponding to the logical address as a start address, wherein the physical address is an address within a random access zone.

Furthermore, the controller 200 may back up, onto the backup zone 100*a*, data stored in the random access zone 300*b* based on a preset criterion. Furthermore, when the state of the controller 200 switches to an on state after power is off, the controller 200 may recover the data stored in the backup zone 100*a* into the random access zone 300*b*.

The controller 200 may identify a zone index matched with the start logical address of an operation based on the zone mapping table 600, and may identify whether the zone index is the random access zone 300*b* or the sequential zone 100*b*.

For example, if the start logical block address of an operation is LBA 5, the controller 200 may identify that LBA 5 belongs to a logical block address group 0 (LBAG 0 in FIG. 6) based on the zone mapping table, and may identify that the logical block address group 0 is matched with a zone index 0 and thus belongs to the sequential zone 100*b*. In this case, a case where the logical block address group 0 includes LBA 0 to LBA 99 and is matched with the zone index 0 may be described as an example. As described above, LBAs and a zone index matched with each logical block address group may be preset.

The controller 200 may differently apply a process of identifying a physical address when a write command or read command for the random access zone 300*b* is received because the random access zone 300*b* corresponds to a volatile memory and the sequential zone 100*b* corresponds to a non-volatile memory.

If a logical address received along with a write command from the host apparatus 20 belongs to the sequential zone 100*b*, the controller 200 may identify a zone index matched with the start logical address of a zone based on the zone mapping table, may write data, corresponding to the size of the data received when the write command is received, from a location next to the final write location of the identified zone index, and then may update the final write location in the zone mapping table.

For example, if the start logical address of a zone is in LBA 5, the controller 200 may identify a logical address group 0 and zone index 0, matched with LBA 5, based on the zone mapping table. If the final write physical address of the zone index 0 is 10, the controller 200 may write data, corresponding to the size (e.g. 4) of data received when a write command is received, starting from physical address 11 of the zone corresponding to zone index 0. Furthermore, the controller 200 may update a physical address 14 as the final write location in the zone mapping table.

If a logical address received along with a write command from the host apparatus 20 belongs to the random access zone 300*b*, the controller 200 may write data, corresponding to the size of the data received from the host apparatus 20, based on a start physical address of the random access zone 300*b*.

For example, if the start logical address of a write operation corresponds to LBA 902, the controller 200, based on the zone mapping table, may identify a logical block address group (LBAG) 10 to which LBA 902 belongs and a zone index 10, which is preset in this example as being the zone index of a zone in the random access zone 300*b*. If the physical addresses of the region 300a of the volatile memory 300 in which the zone mapping table and system information are stored are included in physical blocks 0 to 599 (wherein, for example, each block includes 4 KB) and the physical addresses of the random access zone 300b are in physical blocks 600 to 999, the controller 200 may write data, corresponding to the size (e.g. 4) of data, at an offset from physical block address 600, that is, the start physical address of the random access zone 300b. For example, if the start logical address of the write operation corresponds to an address offset of 9000 from the beginning of LBAG 10 (to which LBA 902 belongs), the write operation would be performed using a start physical address that is offset by 9000 from the beginning of physical block 600. In this case, the controller 200 may write data from the start physical address of the random access zone 300b because the random access zone 300b corresponds to a volatile random-access memory.

If a logical address received along with a read command from the host apparatus 20 belongs to the sequential zone 100b, the controller 200 may identify a zone index matched with the logical address based on the zone mapping table, and may read data corresponding to the size of data received from the host apparatus 20 using a physical address, corresponding to the logical address in a corresponding zone of the identified zone index, as a start address.

If a logical address received along with a read command from the host apparatus 20 belongs to the random access zone 300b, the controller 200 may identify the final physical address by adding the offset relative to the corresponding logical block address group of the logical address, received from the host apparatus 20, to a start physical address of the random access zone 300b, and may read data, corresponding to the size of data received from the host apparatus 20, from the final physical address. For example, if the logical address corresponds to an offset of 8000 from the beginning of LBAG 10, and LBAG 10 is mapped to a zone beginning at the start of the random access zone 300b, then the start physical address would be an address offset by 8000 from the start of the random access zone 300b.

Referring to FIG. 7, the random access zone 300b may include a plurality of slice regions (backup slices) 0 to n. Random access indices 0 to n may be sequentially assigned to the plurality of slice regions, respectively. In this case, the random access index may be defined to mean an index assigned to each of the plurality of slice regions within the random access zone 300b. The slice region may have a size corresponding to the size of data which may be written at a time (that is, to a page size of the non-volatile memory 100), but embodiments are not limited thereto.

Furthermore, each of the random indices may be matched with a flush flag (Flush 1 or 0), indicating whether data stored in the corresponding slice of the random access zone 300b is backed up onto the backup zone 100a, and an update flag (Update 1 or 0) indicating whether data stored in the corresponding slice of the random access zone 300b has been updated with new data.

Furthermore, the backup zone 100a may include a first region (Index 0, Index 1) onto which data written in the random access zone 300b is backed up in a one-to-one way and a second region (Index 2) onto which the latest data updated in the random access zone 300b is backed up when power is turned off or interrupted. Each of the first region and the second region may be matched with each virtual backup index. One or more backup indices may be assigned to each backup zone. For example, two backup indices, such as Index 0 and Index 1, may be assigned to the first region, and one backup index, such as Index 2, may be assigned to the second region.

As illustrated in FIG. 7, the first region may be configured to include two or more subregions respectively corresponding to Index 0 and Index 1, where each subregion of the first region has a size equal to or greater than the size of the random access zone 300b.

The controller 200 may separately manage, as system information, an indication of at which backup index of each of the first and second regions the latest data is stored; that is, which indices are the latest backup indices. The information on the latest backup index may be stored in the volatile memory 300 as system information.

For example, if the amount of data written in the random access zone 300b is a reference value or more, the controller 200 may back up, onto the backup zone 100a, the data stored in the random access zone 300b, and may change a value of a corresponding flush flag for the backed-up random access zone to 1 (i.e., one). When the data was backed up to the subregion corresponding to index 0 of the backup zone 100a, the controller 200 may set index 0 as the latest backup index for the first region. When the data was backed up to the subregion corresponding to index 1 of the backup zone 100a, the controller 200 may set index 1 as the latest backup index for the first region. Furthermore, in an embodiment, the controller 200 may erase the subregion corresponding to index 1 after the data was backed up to the subregion corresponding to index 0 and may erase the subregion corresponding to index 0 after the data was backed up to the subregion corresponding to index 1, in order to prepare for the next backup operation. Furthermore, after backing up the data to the first region, the controller 200 may erase the second region and reset the update flags for the slices, to prepare the second region to accept backup data when, for example, power fails. In such embodiments, the controller 200 may alternate between backing up the random access zone 300b to the subregions of index 0 and index 1.

For another example, if the number of write commands received from the host apparatus 20 is a reference value or more, the controller 200 may sequentially write, in the backup zone 100a, data stored in a plurality of slice regions based on random access index numbers, and may change values of flush flags, for the backed-up slice regions, to 1 (i.e., one). In this case, the flush flag having a value of 1 may indicate that data has been backed up onto the backup zone 100a. The flush flag having a value of 0 may indicate that data has not been backed up onto the backup zone 100a.

The controller 200 may apply, as a backup condition, a condition in which data written in response to a request from the host apparatus 20 reaches a slice size, not the number of write commands, but embodiments are not limited thereto. The backup condition may be changed or added to depending on an operator's needs.

When the backup of data for all the slice regions within the random access zone 300b is completed, the controller 200 may reset the values of all the flush flags to 0 (i.e., zero).

After data stored in the plurality of slice regions is written in the backup zone 100a, if the update of data stored in the random access zone 300b occurs from the host apparatus 20, the controller 200 may change a value of an update flag for a corresponding slice region to 1 (i.e., one). In this case, the update flag 1 may indicate that data has been updated with new data, but has not been backed up since the update. The update flag 0 may indicate that there is no new data has not been backed up onto the backup zone 100a.

Referring to FIG. 7, the controller 200 may back up, onto the second region (Index 2), data that is stored in the random access zone 300*b* and that has an update flag of 1. After the backup of update data is completed, the controller 200 may reset the update flag for a corresponding slice region to 0.

In particular, in an embodiment, when a signal for power-off is received, the controller 200 may write, in the second region (Index 2), data that is stored in the random access zone 300*b* and that has a flush flag of 0 (indicating that a backup operation to the first region was only partly completed and did not back up the data) or update flag of 1 (indicating that the data was modified since the last backup to the first region). When the data is written in the second region (Index 2), the controller 200 may also store a corresponding random access index. In this case, the random access index may be written in a spare region of the first page of the second region. When a plurality of slices are backed up to the second region, a plurality of corresponding random access indices may be stored in the spare region of the first page of the second region, or in another embodiment may be stored in spare regions of the pages used to store the respective slices. The stored random access index (or indices) may be used to identify a location of the backed up data within a random access zone prior to the backup when the data is recovered.

In the case of an abnormal termination, the data storage apparatus 10 may perform a backup operation based on an internal capacity or by external power.

Referring to FIG. 8, when the state of the controller 200 switches to an on state after power is off, the controller 200 may calculate physical addresses corresponding to the latest backup index of a first region (either the subregion corresponding to Index 0 or the subregion corresponding to Index 1), and may sequentially read data from the corresponding physical addresses to the random access zone 300*b*. Specifically, the controller 200 may calculate the final physical address whose data needs to be recovered by incorporating the start physical address of a random access zone into a backup index. In an embodiment, the controller 200 may determine whether the subregion of index 0 or the subregion of index 1 holds the data to be restored by determining which subregion is in an erased state, by using system information stored in the nonvolatile memory, or both.

Furthermore, when the loading of data onto the first region is terminated, the controller 200 may read the latest data, stored in the backup zone 100*a* of the second region (Index 2 in FIG. 8), to the random access zone 300*b*.

The controller 200 may identify a location of the random access zone 300*b* to which the latest data will be written based on a corresponding random access index stored in the second region. In this manner, any data not backed up because of either a failure of a backup operation to the first region to complete or because the data was updated after the last backup operation to the first region will be restored from the second region.

Figure 9:
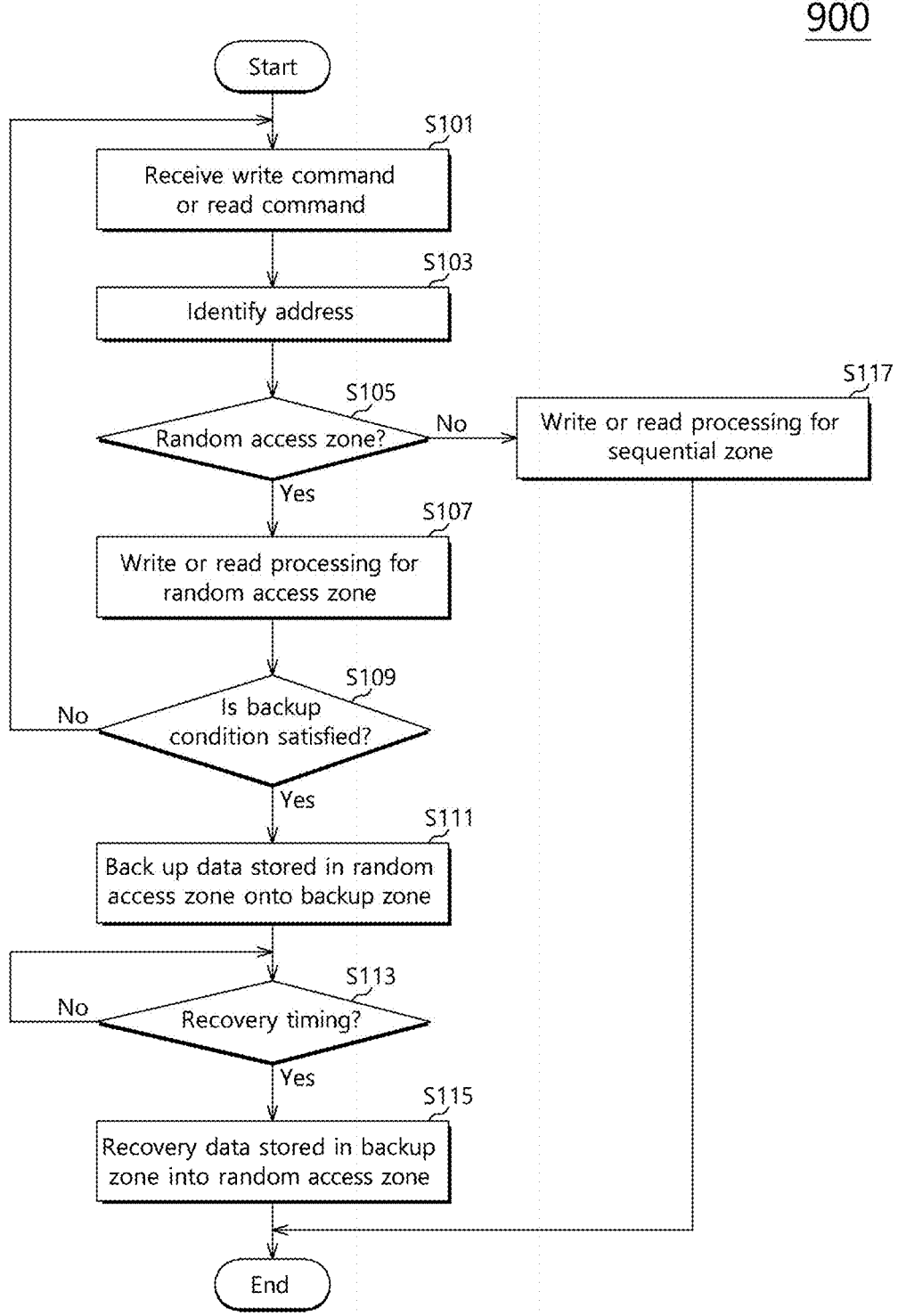
FIG. 9 is a flowchart of an operating process of the data storage apparatus according to an embodiment.

FIG. 9 is a flowchart for describing an operating process 900 of the data storage apparatus 10 according to an embodiment.

Referring to FIG. 9, the data storage apparatus 10 may receive a logical address received along with a write command or a read command from the host apparatus 20 (S101). The data storage apparatus 10 may also receive the size of data when receiving the write command or read command from the host apparatus 20.

Next, the data storage apparatus 10 may identify whether the logical address belongs to the random access zone 300*b* within the volatile memory 300 or to the sequential zone 100*b* within the non-volatile memory 100 (S103 and S105).

The logical address may mean the start logical address of an operation corresponding to the command. If the logical address belongs to the random access zone or the sequential zone, this may respectively mean that a physical address corresponding to the logical address belongs to the random access zone or the sequential zone. That is, if the logical address belongs to the sequential zone, the data storage apparatus 10 may control an operation, corresponding to the write command or read command, to be performed using the physical address corresponding to the logical address as a start address.

The volatile memory 300 may include the region 300*a* in which a zone mapping table and system information are stored and the random access zone 300*b* capable of random write. The non-volatile memory 100 may include the backup zone 100*a* and the plurality of sequential zones 100*b* capable of sequential write.

The data storage apparatus 10 may perform an operation, corresponding to the write command or read command, based on the random access zone 300*b* or sequential zone 100*b* identified at step S103 (S107 and S117). This will be described in detail later.

Next, the data storage apparatus 10 may back up data, stored in the random access zone 300*b*, onto the backup zone 100*a* based on a preset criterion (S109 and S111).

The random access zone 300*b* may include a plurality of slice regions. Each of the plurality of slice regions is matched with a random access index. Each of the random access indices may be matched with a flush flag, indicating whether data stored in the random access zone 300*b* has been backed up onto the backup zone 100*a*, and an update flag indicating whether data stored in the random access zone 300*b* has been updated with new data.

The backup zone 100*a* may include the first region (as shown in FIG. 7) onto which data written in the random access zone 300*b* is backed up in a one-to-one way and the second region (as also shown in FIG. 7) onto which the latest data updated in the random access zone 300*b* is backed up when power is turned off or otherwise interrupted. Each of the first region and the second region may have a respective latest backup index identifying a subregion that stores the latest backed up data in that region.

For example, at steps S109 and S111, if the amount of data written in the random access zone 300*b* is a reference value or more, the data storage apparatus 10 may back up, onto the backup zone 100*a*, the data stored in the random access zone 300*b*, and may change a value of a corresponding flush flag for the backed-up random access zone 300*b* to 1 (i.e., one).

For another example, at steps S109 and S111, if the number of write commands received from the host apparatus 20 is a reference value or more, the data storage apparatus 10 may sequentially write, in the backup zone 100*a*, data stored in the plurality of slice regions based on random access index numbers.

Referring to FIG. 7, the data storage apparatus 10 may sequentially back up, onto the backup zone 100*a*, data stored in slice regions from a random access index 0 to a random access index n.

Thereafter, the data storage apparatus 10 may change values of flush flags for the backed-up slice regions to 1 (i.e., one).

Next, after the data stored in the plurality of slice regions is written in the backup zone 100*a*, if the update of data stored in the random access zone 300*b* occurs from the host apparatus 20, the data storage apparatus 10 may change a value of an update flag for a corresponding slice region to 1 (i.e., one).

When a signal for power-off is received, the data storage apparatus 10 may write, in the second region (Index 2), data in the random access zone 300*b* having a flush flag of 0 (Flush 0) or update flag of 1 (Update 1).

When the data is written in the second region, the data storage apparatus 10 may also store a corresponding random access index.

Next, when the state of the data storage apparatus 10 switches to an on state after power is off, the data storage apparatus 10 may recover the data stored in the backup zone 100*a* into the random access zone 300*b* (S113 and S115). Note that although S113 and S115 are shown as following after S111, embodiments are not limited thereto, and a power interruption and subsequent recovery may occur at any time during the process 900 of FIG. 9.

Specifically, when the state of the data storage apparatus 10 switches to an on state after power is off, the data storage apparatus 10 may calculate physical addresses corresponding to the latest backup index of the first region (such as, for example Index 0 or Index 1), and may sequentially read data from the physical addresses to the random access zone 300*b*.

In this case, the data storage apparatus 10 may separately manage, as system information, a latest backup index that belongs to the first region and a latest backup index that belongs to the second region, each indicating where in their region the latest data is stored. The latest backup index may be stored in the volatile memory 300 as system information. After identifying the latest backup index, the data storage apparatus 10 may recover the data of the corresponding backup index into the random access zone 300*b* at step S115.

Next, when the loading of data from the first region is completed, the data storage apparatus 10 may read the latest data, stored in the second region of the backup zone 100*a*, to the random access zone 300*b*.

Figure 10:
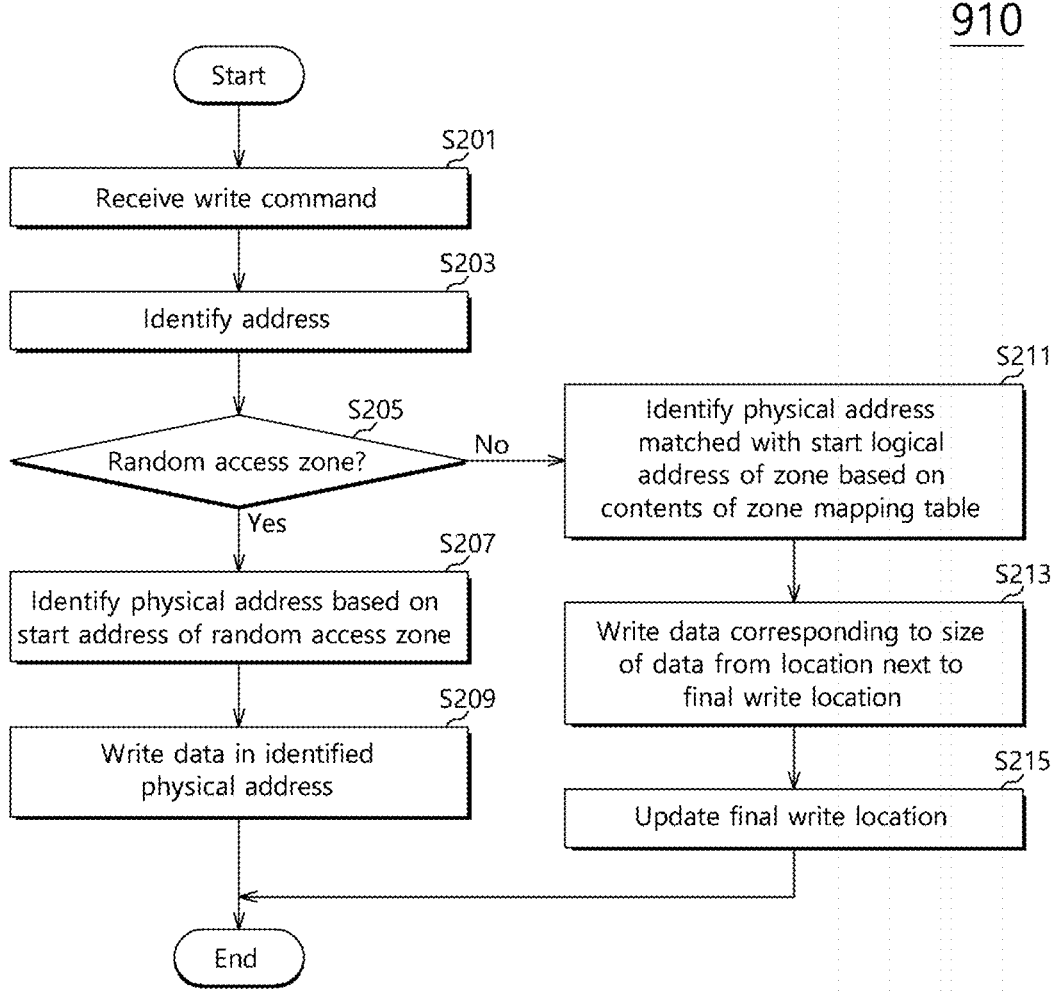
FIG. 10 is a flowchart of a data write process in FIG. 9, according to an embodiment.

FIG. 10 is a detailed flowchart for the data write process 910 such as may be used in the process 900 of FIG. 9.

The data storage apparatus 10 may receive a logical address along with a write command from the host apparatus 20 (S201). The controller 200 may also receive the size of data when receiving a write command or read command from the host apparatus 20.

Next, the data storage apparatus 10 may identify whether the logical address belongs to the random access zone 300*b* within the volatile memory or the sequential zone 100*b* within the non-volatile memory 100 (S203 and S205).

If, as a result of the identification at step S205, the logical address belongs to the random access zone 300*b*, the data storage apparatus 10 may write data, corresponding to the size of the data received from the host apparatus 20, based on a start physical address of the random access zone 300*b* (S207 and S209).

If, as a result of the identification at step S205, the logical address belongs to the sequential zone 100*b*, the data storage apparatus 10 may identify a zone index, matched with the logical address received along with the write command from the host apparatus 20, based on the zone mapping table.

Next, the data storage apparatus 10 may identify a physical address on which a write operation will be performed by identifying the final write location of the identified zone index (S211).

Next, the data storage apparatus 10 may write data, corresponding to the size of the data, from a location next to the final write location of the identified zone index (S213). In an embodiment, the size of the data may correspond to a page size of the sequential zone 100*b*. In another embodiment, the size of the data may be less than a page size of the sequential zone 100*b*, and a read-modify-write operation may be used to perform the write of the data.

Next, after performing the write operation, the data storage apparatus 10 may update the final write location in the zone mapping table (S215).

Figure 11:
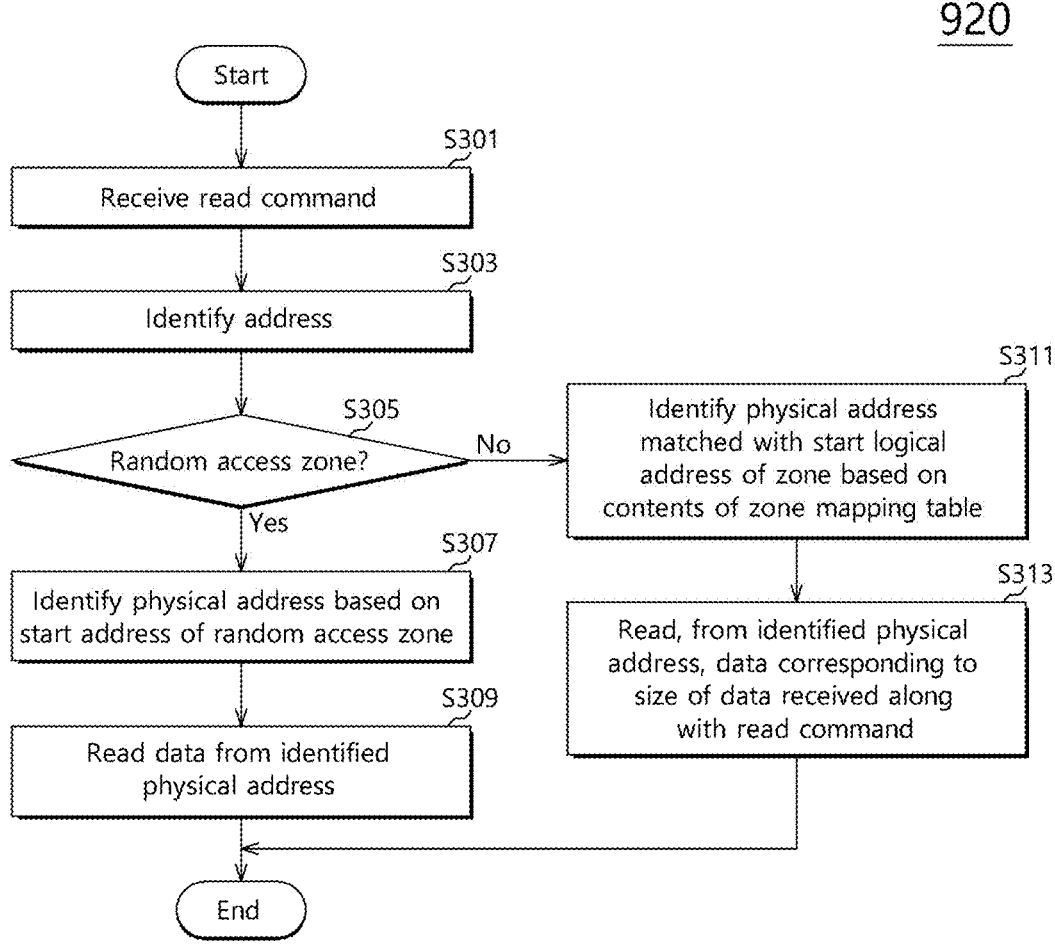
FIG. 11 is a flowchart of a data read process in FIG. 9, according to an embodiment.

FIG. 11 is a detailed flowchart for describing a data read process 920 such as may be used in the process 900 of FIG. 9.

The data storage apparatus 10 may receive a logical address along with a read command from the host apparatus 20 (S301). Next, the data storage apparatus 10 may identify whether the logical address belongs to the random access zone 300*b* within the volatile memory or the sequential zone 100*b* within the non-volatile memory (S303 and S305).

If, as a result of the identification at step S305, the logical address belongs to the random access zone 300*b*, the data storage apparatus 10 may identify the final physical address by adding a portion of the logical address, such as the logical address's offset from a start logical address of the corresponding logical block address group, to a start physical address of the random access zone 300*b* (S307).

As illustrated in FIG. 5, in the volatile memory 300, the region 300*a* in which the zone mapping table and system information are stored occupies a part of a memory space and the remaining marginal space is used as the random access zone 300*b*. Accordingly, the start physical address of the random access zone 300*b* is not 0, but may be a physical address after the region 300*a* in which the zone mapping table and system information are stored. As a result, the data storage apparatus 10 may identify the final physical address from which data will be actually read, by adding all or a portion of the start logical address of a command received from the host apparatus 20, to the start physical address of the random access zone 300*b*.

Next, the data storage apparatus 10 may read, from the final physical address, data corresponding to the size of the data received when the read command is received (S309).

If, as a result of the identification at step S305, the logical address belongs to the sequential zone 100*b*, the data storage apparatus 10 may identify a zone index matched with the logical address based on the zone mapping table. The data storage apparatus 10 may identify a start physical address corresponding to the logical address at the identified zone index (S311).

Next, the data storage apparatus 10 may read data, corresponding to the size of the data requested by the host apparatus 20, from the start physical address identified at step S311 (S313).

Figure 12:
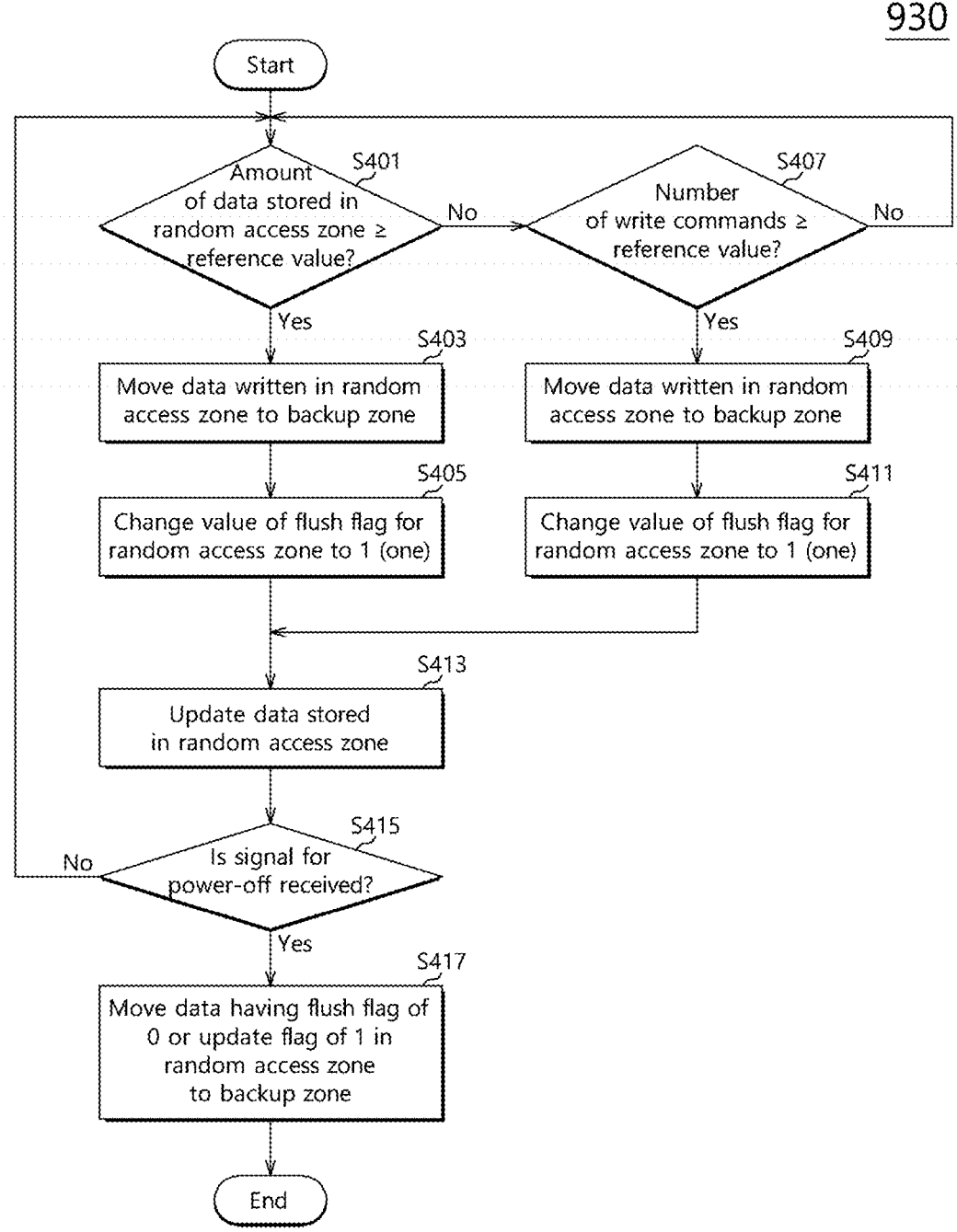
FIG. 12 is a flowchart of an operating process of the data storage apparatus according to another embodiment.

FIG. 12 is a flowchart for describing an operating process 930 of the data storage apparatus according to another embodiment. A case where the data storage apparatus 10 moves data stored in the random access zone 300*b* to the backup zone 100*a* will be described as an example.

If a backup condition is satisfied, the data storage apparatus 10 may back up data stored in the random access zone 300*b* onto the backup zone 100*a*.

For example, the data storage apparatus 10 may identify whether the amount of data written in the random access zone 300*b* is a reference value or more (S401).

The random access zone 300*b* may include a plurality of slice regions. Each of the plurality of slice regions may be matched with a respective random access index. Each of the random access indices may be matched with a flush flag, indicating whether data stored in the random access zone 300*b* has been backed up onto the backup zone 100*a*, and an update flag indicating whether data stored in the random access zone 300b has been updated with new data.

The backup zone 100a may include the first region (shown in FIG. 7) onto which data written in the random access zone 300b is backed up in a one-to-one way and the second region (also shown in FIG. 7) onto which the latest data updated in the random access zone 300b is backed up when power is turned off or interrupted. Each of the first region and the second region may have a respective latest backup index indicating a subregion of the respective region that includes the latest backed up data.

If, as a result of the identification, the amount of the data written in the random access zone 300b is a reference value or more, the data storage apparatus 10 may sequentially write, in the backup zone 100a, data stored in a plurality of slice regions within the random access zone 300b, based on random access index numbers (S403).

Next, the data storage apparatus 10 may change a value of a corresponding flush flag for the backed-up random access zone 300b to 1 (i.e., one) (S405).

If, as a result of the identification at step S401, the amount of the data written in the random access zone 300b is not the reference value or more, the data storage apparatus 10 may identify whether the number of write commands received from the host apparatus 20 is a reference value or more (S407).

If, as a result of the identification at step S407, the number of write commands is the reference value or more, the data storage apparatus 10 may sequentially write, in the backup zone 100a, data stored in a plurality of slice regions based on random access index numbers (S409).

Thereafter, the data storage apparatus 10 may change a value of a corresponding flush flag for the backed-up slice region to 1 (i.e., one) (S411).

Next, if the update of data stored in the random access zone 300b occurs from the host apparatus 20 after the data stored in the plurality of slice regions is written in the first region of the backup zone 100a, the data storage apparatus 10 may change a value of a corresponding update flag for a corresponding slice region to 1 (i.e., one) (S413).

When a signal for power-off is received (S415), the data storage apparatus 10 may write, in the second region (Index 2), data having a flush flag of 0 (Flush 0) or update flag of 1 (Update 1) in the second region of the random access zone 300b (S417). When the data is written in the second region, the data storage apparatus 10 may also store a corresponding random access index for each slice written.

Although not illustrated, when the state of the data storage apparatus 10 switches to an on state after power is off, the data storage apparatus 10 may recover the data stored in the backup zone 100a into the random access zone 300b.

Figure 13:
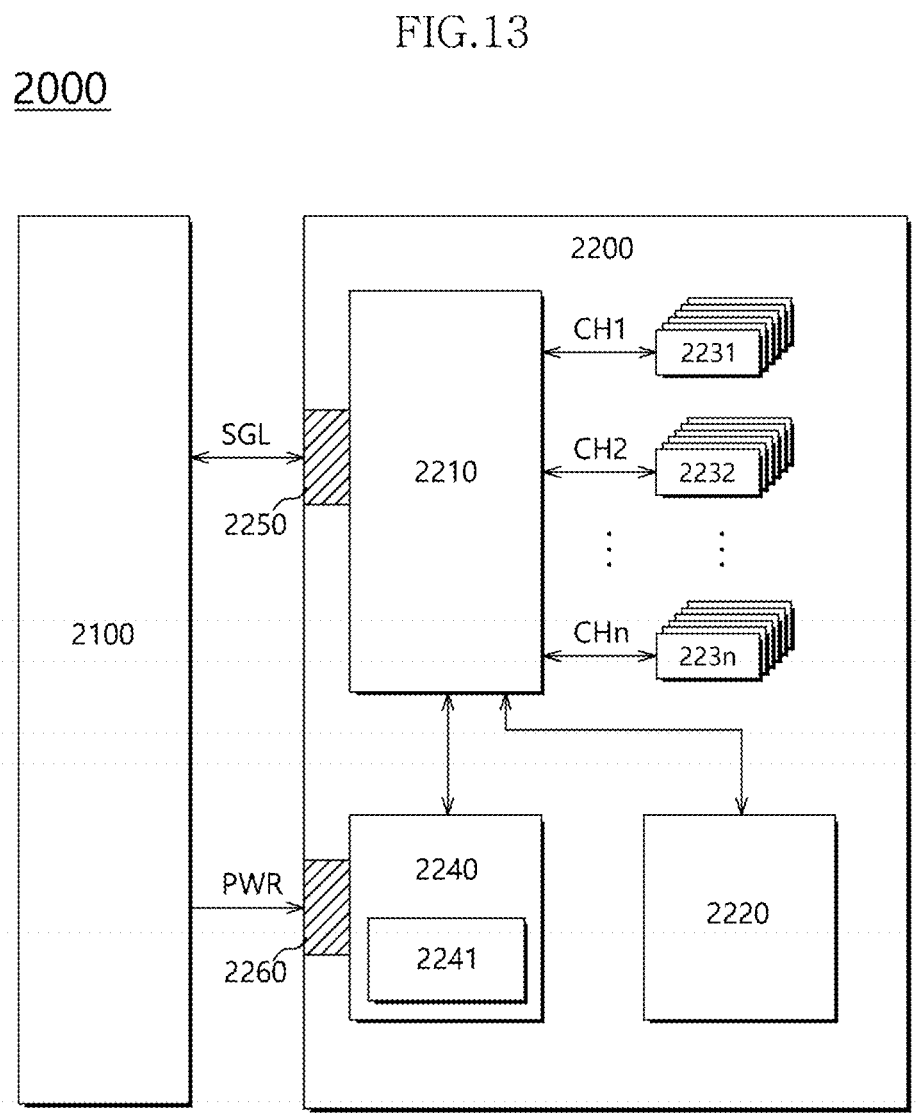
FIG. 13 illustrates a data processing system including a solid state drive (SSD) according to an embodiment.

FIG. 13 is a diagram illustrating a data processing system 2000 including a solid state drive (SSD) according to an embodiment. Referring to FIG. 13, the data processing system 2000 may include a host apparatus 2100 and an solid state drive 2200 (hereinafter referred to as an "SSD").

The SSD 2200 may include a controller 2210, a buffer memory apparatus 2220, non-volatile memories 2231 to 223n, a power supply 2240, a signal connector 2250 and a power connector 2260.

The controller 2210 may control an overall operation of the SSD 2200.

The buffer memory apparatus 2220 may temporarily store data to be stored in the non-volatile memories 2231 to 223n. Furthermore, the buffer memory apparatus 2220 may temporarily store data read from the non-volatile memories 2231 to 223n. The data temporarily stored in the buffer memory apparatus 2220 may be transmitted to the host apparatus 2100 or the non-volatile memories 2231 to 223n under the control of the controller 2210.

The non-volatile memories 2231 to 223n may be used as storage media of the SSD 2200. The non-volatile memories 2231 to 223n may be electrically coupled to the controller 2210 through a plurality of channels CH1 to CHn. One or more non-volatile memories may be electrically coupled to one channel. Non-volatile memories electrically coupled to one channel may be electrically coupled to the same signal bus and data bus.

The power supply 2240 may provide a power supply PWR, received through the power connector 2260, into the SSD 2200. The power supply 2240 may include an auxiliary power supply 2241. If sudden power-off occurs, the auxiliary power supply 2241 may supply power so that the SSD 2200 is terminated normally. The auxiliary power supply 2241 may include high-capacity capacitors capable of being charged with the power supply PWR.

The controller 2210 may exchange signals SGL with the host apparatus 2100 through the signal connector 2250. In this case, the signal SGL may include a command, an address, data, etc. The signal connector 2250 may be configured with various types of connectors based on an interface used between the host apparatus 2100 and the SSD 2200.

Figure 14:
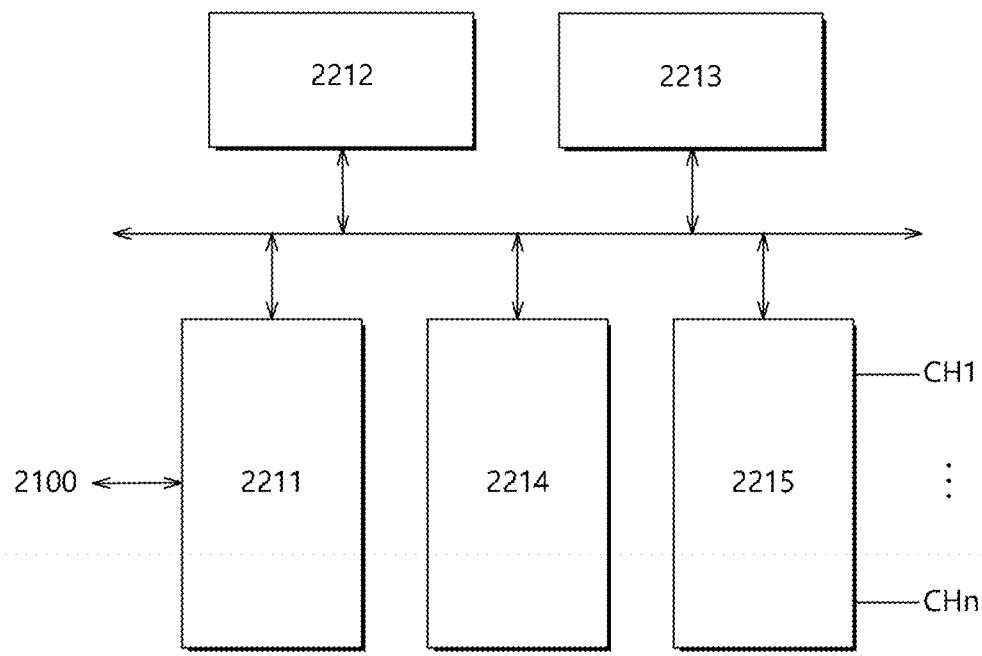
FIG. 14 illustrates a controller in FIG. 13, according to an embodiment.

FIG. 14 is a diagram illustrating the configuration of the controller 2100 in FIG. 13. Referring to FIG. 14, the controller 2210 may include a host interface unit 2211, a control unit 2212, a random access memory 2213, an error correction code (ECC) unit 2214 and a memory interface unit 2215.

The host interface unit 2211 may provide an interface between the host apparatus 2100 and the SSD 2200 based on a protocol of the host apparatus 2100. For example, the host interface unit 2211 may communicate with the host apparatus 2100 through any one of protocols, such as secure digital, a universal serial bus (USB), a multi-media card (MMC), an embedded MMC (eMMC), personal computer memory card international association (PCMCIA), parallel advanced technology attachment (PATA), serial advanced technology attachment (SATA), a small computer system interface (SCSI), a serial attached SCSI (SAS), peripheral component interconnection (PCI), PCI express (PCI-E), and a universal flash storage (UFS). Furthermore, the host interface unit 2211 may perform a disk emulation function for enabling the host apparatus 2100 to recognize the SSD 2200 as a general-purpose data storage apparatus, for example, a hard disk drive (HDD).

The control unit 2212 may analyze and process a signal SGL received from the host apparatus 2100. The control unit 2212 may control operations of internal function blocks based on firmware or software for driving the SSD 2200. The random access memory 2213 may be used as a working memory for driving such firmware or software.

The ECC unit 2214 may generate parity data of data to be transmitted to the non-volatile memories 2231 to 223n. The generated parity data may be stored in the non-volatile memories 2231 to 223n along with data. The ECC unit 2214 may detect an error of data read from the non-volatile memories 2231 to 223n based on the parity data. If the detected error is within a correctable range, the ECC unit 2214 may correct the detected error.

The memory interface unit 2215 may provide the non-volatile memories 2231 to 223n with control signals, such as a command and an address, under the control of the control unit 2212. Furthermore, the memory interface unit 2215 may exchange data with the non-volatile memories 2231 to 223n under the control of the control unit 2212. For example, the memory interface unit 2215 may provide the non-volatile memories 2231 to 223n with data stored in the buffer memory apparatus 2220 or may provide the buffer memory apparatus 2220 with data read from the non-volatile memories 2231 to 223n.

Figure 15:
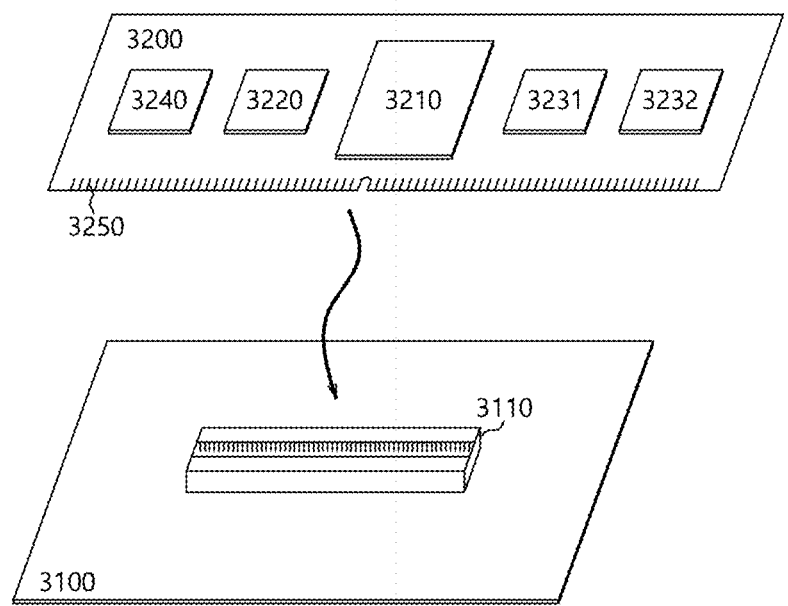
FIG. 15 illustrates a data processing system including a data storage apparatus according to an embodiment.

FIG. 15 is a diagram illustrating a data processing system 3000 including a data storage apparatus according to an embodiment. Referring to FIG. 15, the data processing system 3000 may include a host apparatus 3100 and a data storage apparatus 3200.

The host apparatus 3100 may be configured in a board form, such as a printed circuit board (PCB). Although not illustrated, the host apparatus 3100 may include internal function blocks for performing functions of the host apparatus.

The host apparatus 3100 may include a connection terminal 3110, such as a socket, a slot or a connector. The data storage apparatus 3200 may be mounted on the connection terminal 3110.

The data storage apparatus 3200 may be configured in a board form, such as a PCB. The data storage apparatus 3200 may be called a memory module or a memory card. The data storage apparatus 3200 may include a controller 3210, a buffer memory apparatus 3220, non-volatile memories 3231 and 3232, a power management integrated circuit (PMIC) 3240 and a connection terminal 3250.

The controller 3210 may control an overall operation of the data storage apparatus 3200. The controller 3210 may be configured identically with the controller 2210 of FIG. 15.

The buffer memory apparatus 3220 may temporarily store data to be stored in the non-volatile memories 3231 and 3232. Furthermore, the buffer memory apparatus 3220 may temporarily store data read from the non-volatile memories 3231 and 3232. The data temporarily stored in the buffer memory apparatus 3220 may be transmitted to the host apparatus 3100 or the non-volatile memories 3231 and 3232 under the control of the controller 3210.

The non-volatile memories 3231 and 3232 may be used as storage media of the data storage apparatus 3200.

The PMIC 3240 may provide power, received through the connection terminal 3250, into the data storage apparatus 3200. The PMIC 3240 may manage power of the data storage apparatus 3200 under the control of the controller 3210.

The connection terminal 3250 may be electrically coupled to the connection terminal 3110 of the host apparatus. Signals, such as a command, an address and data, and power may be transmitted between the host apparatus 3100 and the data storage apparatus 3200 through the connection terminal 3250. The connection terminal 3250 may be configured in various forms based on an interface process between the host apparatus 3100 and the data storage apparatus 3200. The connection terminal 3250 may be positioned on any one side of the data storage apparatus 3200.

Figure 16:
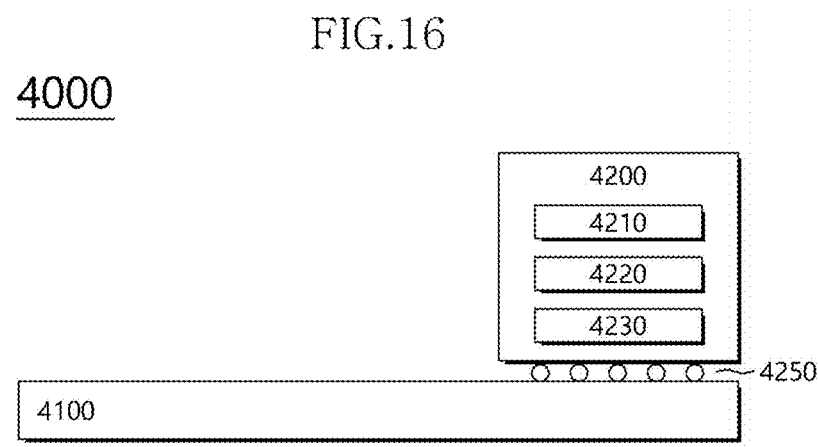
FIG. 16 illustrates a data processing system including a data storage apparatus according to an embodiment.

FIG. 16 is a diagram illustrating a data processing system 4000 including a data storage apparatus according to an embodiment. Referring to FIG. 16, the data processing system 4000 may include a host apparatus 4100 and a data storage apparatus 4200.

The host apparatus 4100 may be configured in a board form, such as a PCB. Although not illustrated, the host apparatus 4100 may include internal function blocks for performing functions of the host apparatus.

The data storage apparatus 4200 may be configured in a flap-type package form. The data storage apparatus 4200 may be mounted on the host apparatus 4100 through solder balls 4250. The data storage apparatus 4200 may include a controller 4210, a buffer memory apparatus 4220 and a non-volatile memory 4230.

The controller 4210 may control an overall operation of the data storage apparatus 4200. The controller 4210 may be configured identically with the controller 3210 of FIG. 15.

The buffer memory apparatus 4220 may temporarily store data to be stored in the non-volatile memory 4230. Furthermore, the buffer memory apparatus 4220 may temporarily store data read from the non-volatile memory 4230. The data temporarily stored in the buffer memory apparatus 4220 may be transmitted to the host apparatus 4100 or the non-volatile memory 4230 under the control of the controller 4210.

The non-volatile memory 4230 may be used as a storage medium of the data storage apparatus 4200.

Figure 17:
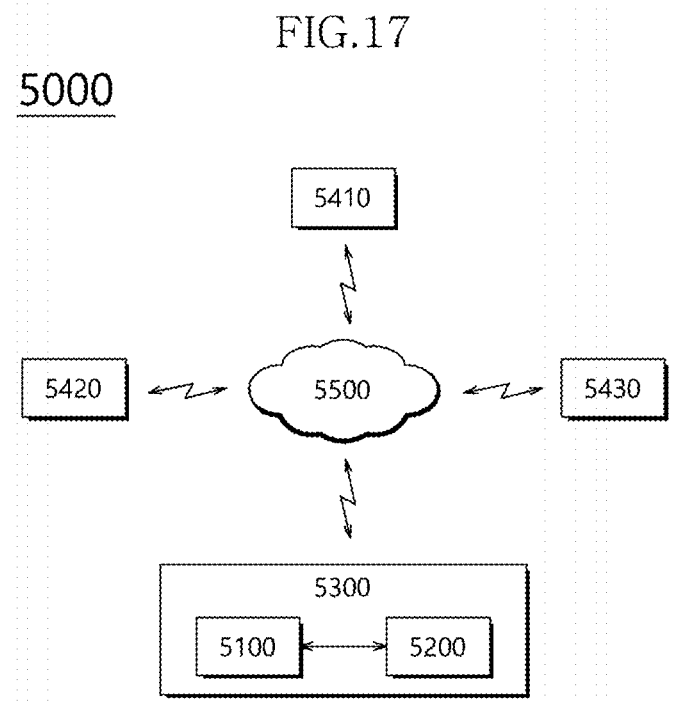
FIG. 17 illustrates a network system including a data storage apparatus according to an embodiment.

FIG. 17 is a diagram illustrating a network system 5000 including a data storage apparatus according to an embodiment. Referring to FIG. 17, the network system 5000 may include a server system 5300 and a plurality of client systems 5410, 5420 and 5430, which are electrically coupled over a network 5500.

The server system 5300 may serve data in response to a request from the plurality of client systems 5410, 5420 and 5430. For example, the server system 5300 may store data provided by the plurality of client systems 5410, 5420 and 5430. For another example, the server system 5300 may provide data to the plurality of client systems 5410, 5420 and 5430.

The server system 5300 may include a host apparatus 5100 and a data storage apparatus 5200. The data storage apparatus 5200 may be configured with the data storage apparatus 10 of FIG. 1, the SSD 2200 of FIG. 13, the data storage apparatus 3200 of FIG. 15 and the data storage apparatus 4200 of FIG. 16.

Those skilled in the art to which this disclosure pertains should understand that the embodiments are only illustrative from all aspects not being limitative because this disclosure may be implemented in various other forms without departing from the technical spirit or essential characteristics of this disclosure. Accordingly, the scope of this disclosure is defined by the appended claims rather than by the detailed description, and all modifications or variations derived from the meanings and scope of the claims and equivalents thereof should be understood as being included in the scope of this disclosure.

While various embodiments have been described above, it will be understood to those skilled in the art that the embodiments described are by way of example only. Accordingly, the data storage apparatus and method described herein should not be limited based on the described embodiments.

What is claimed is:

1. A data storage apparatus comprising:
a volatile memory, the volatile memory including a region in which a zone mapping table and system information are stored and a random access zone suitable for random writes;
a non-volatile memory including a backup zone and a plurality of sequential zones suitable for sequential writes; and
a controller configured to identify whether a logical address received with a command from a host apparatus belongs to the random access zone or to the sequential zone and to control an operation corresponding to the command of the identified zone, to control the operation corresponding to the command using a physical address corresponding to the logical address as a start address when the logical address belongs to the sequential zone, to back up data stored in the random access zone onto the backup zone based on a criterion and to recover the data stored in the backup zone into the random access zone when a state of the controller switches to an on state after power is off, wherein the command is a write command or a read command, and wherein the zone mapping table comprises one or more entries, each entry including a logical block address group, a zone index, a start physical address, a total length, and a final write location.

2. The data storage apparatus according to claim 1, wherein when the logical address received with the write command from the host apparatus belongs to the sequential zone, the controller is configured to:

identify a zone index matched with the logical address using the zone mapping table, write data, corresponding to a size of data received from the host apparatus, from a location next to the final write location corresponding to the identified zone index, and update the final write location corresponding to the identified zone index in the zone mapping table.

3. The data storage apparatus according to claim 1, wherein when the logical address received with the write command from the host apparatus belongs to the random access zone, the controller is configured to:

write data, corresponding to a size of data received from the host apparatus, from a location based on a start physical address of the random access zone.

4. The data storage apparatus according to claim 1, wherein when the logical address received along with the read command from the host apparatus belongs to the sequential zone, the controller is configured to:

identify a zone index matched with the logical address using the zone mapping table, and read data, corresponding to a size of data received from the host apparatus, using a physical address corresponding to the logical address as a start address in a corresponding zone of the identified zone index.

5. The data storage apparatus according to claim 1, wherein when the logical address received with the read command from the host apparatus belongs to the random access zone, the controller is configured to:

identify a final physical address by adding, to a start physical address of the random access zone, a value based on the logical address received from the host apparatus, and read data, corresponding to a size of data received from the host apparatus, from the final physical address.

6. The data storage apparatus according to claim 1, wherein:

the random access zone comprises a plurality of slice regions, each of the plurality of slice regions is matched with a random access index, and each of the random access indices is matched with a flush flag, indicating whether data stored in the random access zone has been backed up onto the backup zone, and an update flag indicating whether data stored in the random access zone has been updated with new data.

7. The data storage apparatus according to claim 6, wherein the controller is configured to:

back up, onto the backup zone, data stored in the random access zone when an amount of data written in the random access zone is a reference value or more, and change a value of a flush flag for the backed-up random access zone to 1 (one).

8. The data storage apparatus according to claim 6, wherein when the number of write commands received from the host apparatus is a reference value or more, the controller is configured to:

sequentially write, in the backup zone, data stored in the plurality of slice regions based on random access index numbers, and change values of flush flags for the backed-up slice regions to 1 (one).

9. The data storage apparatus according to claim 8, wherein data backup for all the slice regions within the random access zone is completed, the controller is configured to reset values of all the flush flags to 0 (zero).

10. The data storage apparatus according to claim 6, wherein when an update of the data stored in the random access zone occurs from the host apparatus after data stored in the plurality of slice regions is written in the backup zone, the controller is configured to change a value of an update flag for a corresponding slice region to 1 (one).

11. The data storage apparatus according to claim 10, wherein:

the backup zone comprises a first region onto which data written in the random access zone is backed up in a one-to-one way and a second region onto which latest data updated in the random access zone is backed up when power is turned off, and each of the first region and the second region is respectively matched with one or more backup indices.

12. The data storage apparatus according to claim 11, wherein the controller is configured to:

write, in the second region, data having the flush flag of 0 or the update flag of 1 in the random access zone when a signal for power-off is received, and store a corresponding random access index when the data is written in the second region.

13. The data storage apparatus according to claim 12, wherein when a state of the controller switches to an on state after the power is off, the controller is configured to:

calculate physical addresses corresponding to backup indices of the first region, sequentially load data onto the random access zone, and load, onto the random access zone, the latest data stored in the backup zone of the second region when the loading for the first region is terminated.

14. The data storage apparatus according to claim 13, wherein the controller is configured to identify a location of the random access zone into which the latest data is to be written based on the random access index stored in the second region along with the latest data.

15. A method for operating a data storage apparatus, the method comprising:

receiving a logical address and a command from a host;

identifying whether the logical address belongs to a random access zone within a volatile memory or to a sequential zone within a non-volatile memory, the volatile memory including a region in which a zone mapping table and system information are stored and the random access zone suitable for random writes, and the non-volatile memory including a backup zone and a plurality of sequential zones suitable for sequential writes; and performing an operation corresponding to the command based on the identified random access zone or sequential zone, wherein when the logical address belongs to the sequential zone, the operation corresponding to the command is performed using a physical address corresponding to the logical address as a start address, the command being a read command or a write command, and wherein when the logical address belongs to the sequential zone, performing the operation corresponding to the write command comprises:
- identifying, using the zone mapping table, a zone index matched with the logical address received along with the write command from the host apparatus; and
- writing data corresponding to a size of data received from the host apparatus starting from a location next to a final write location of the identified zone index, and
- updating the final write location of the identified zone index in the zone mapping table.

16. The method according to claim 15, wherein when the logical address belongs to the random access zone, performing the operation corresponding to the write command comprises writing data corresponding to a size of data received from the host apparatus based on a start physical address of the random access zone.

17. The method according to claim 15, wherein when the logical address belongs to the sequential zone, the performing the operation corresponding to the read command comprises:
- identifying a zone index matched with the logical address based on the zone mapping table;
- setting, as a start address, a physical address corresponding to the logical address in a corresponding zone of the identified zone index; and
- reading, from the set start address, data corresponding to a size of data received from the host apparatus.

18. The method according to claim 15, wherein when the logical address belongs to the random access zone, performing the operation corresponding to the read command comprises:
- identifying a final physical address by adding, to a start physical address of the random access zone, a value corresponding to the logical address received from the host apparatus, and
- reading, from the final physical address, data corresponding to a size of the data received from a host apparatus.

19. The method according to claim 15, further comprising:
- backing up, onto the backup zone, data stored in the random access zone based on a preset criterion; and
- recovering, into the random access zone, the data stored in the backup zone when switching to an on state after power is off.

20. The method according to claim 19, wherein:
the random access zone comprises a plurality of slice regions,
each of the plurality of slice regions is matched with a random access index, and
each of the random access indices is matched with a flush flag, indicating whether data stored in the random access zone has been backed up onto the backup zone, and an update flag indicating whether data stored in the random access zone has been updated with new data.

21. The method according to claim 20, wherein the backing up, onto the backup zone, of the data comprises:
- backing up, onto the backup zone, data stored in the random access zone when an amount of data written in the random access zone is a reference value or more, and
- changing a value of a flush flag for the backed-up random access zone to 1 (one).

22. The method according to claim 20, wherein the backing up, onto the backup zone, of the data comprises:
- sequentially writing, in the backup zone, data stored in the plurality of slice regions based on random access index numbers when the number of write commands received from the host apparatus is a reference value or more, and
- changing values of flush flags for the backed-up slice regions to 1 (one).

23. The method according to claim 20, wherein the backing up, onto the backup zone, of the data further comprises changing a value of an update flag for a corresponding slice region to 1 (one) when an update of the data stored in the random access zone occurs from the host apparatus after data stored in the plurality of slice regions is written in the backup zone.

24. The method according to claim 23, wherein:
the backup zone comprises a first region onto which data written in the random access zone is backed up in a one-to-one way and a second region onto which the latest data updated in the random access zone is backed up when power is turned off, and
each of the first region and the second region is respectively matched with a one or more backup indices, and
the backing up, onto the backup zone, of the data comprises:
- writing, in the second region, data having the flush flag of 0 or the update flag of 1 in the random access zone when a signal for power-off is received, and
- storing a corresponding random access index when the data is written in the second region.

25. The method according to claim 24, wherein the recovering, into the random access zone, of the data comprises:
- calculating a physical address corresponding to the backup index of the first region and sequentially loading data into the random access zone when switching to an on state after the power is off, and
- loading, onto the random access zone, the latest data stored in the backup zone of the second region when the loading for the first region is terminated.

* * * * *